United States Patent [19]
Collett

[11] Patent Number: 5,866,885
[45] Date of Patent: Feb. 2, 1999

[54] MICROWAVE HEATING AND COOKING RINGS AND LIDS

[76] Inventor: Peter F. Collett, 801 N. Atlantic Ave., Cocoa Beach, Fla. 32931

[21] Appl. No.: 991,178

[22] Filed: Dec. 16, 1997

[51] Int. Cl.[6] .................................................. H05B 6/80
[52] U.S. Cl. .......................... 219/732; 219/725; 219/763; 99/DIG. 14; 99/448
[58] Field of Search .................................. 219/725, 732, 219/734, 735, 762, 763; 99/448, 416, 417, 418, 413, 415, DIG. 14; 126/369, 373, 377

[56] References Cited

U.S. PATENT DOCUMENTS

| 106,457 | 8/1870 | Berry | 99/417 |
|---|---|---|---|
| D. 355,735 | 2/1995 | Shafffer | D32/53 |
| 797,660 | 8/1905 | Brooks | 99/417 |
| 1,453,378 | 5/1923 | Clifford | 126/377 |
| 1,793,298 | 2/1931 | Alaj | D7/540 |
| 1,948,778 | 2/1934 | Zoia | 99/417 |
| 3,642,165 | 2/1972 | Vonderosten | 220/23.83 |
| 4,797,521 | 1/1989 | Liwski | 219/762 |
| 4,847,461 | 7/1989 | Gilmore | 219/10.5 |
| 4,941,401 | 7/1990 | Sarnoff et al. | 219/732 |
| 5,028,754 | 7/1991 | Chiba | 219/10.55 E |
| 5,069,198 | 12/1991 | Henderson | 126/369 |
| 5,216,947 | 6/1993 | Cheng | 99/417 |
| 5,239,153 | 8/1993 | Beckett | 219/10.55 E |

*Primary Examiner*—Philip H. Leung
*Attorney, Agent, or Firm*—Brian S. Steinberger; Law Offices of Brian S. Steinberger

[57] ABSTRACT

A stacking arrangement for simultaneously microwaving plural food filled plates together. Hollow rings with outwardly sloping sides each having side oval through-holes and upper edge grooves are placed on food filled plates so that the plates can be stacked on top of each hollow ring. A cover with outwardly sloping sides has a handle with a lid and through-hole adjacent to the handle covers the top food filled plate in the stack. The stack can be placed in a microwave, heating oven, refrigerator or freezer. The through-holes in the rings and the cover act as vents to allow heat to be evenly dispersed about the food and to allow the food to be more evenly cooked when being microwaved. The cover and rings can be made of microwaveable plastic such as polypropylene. When not being used the rings can together be inserted into the cover for storage.

20 Claims, 5 Drawing Sheets

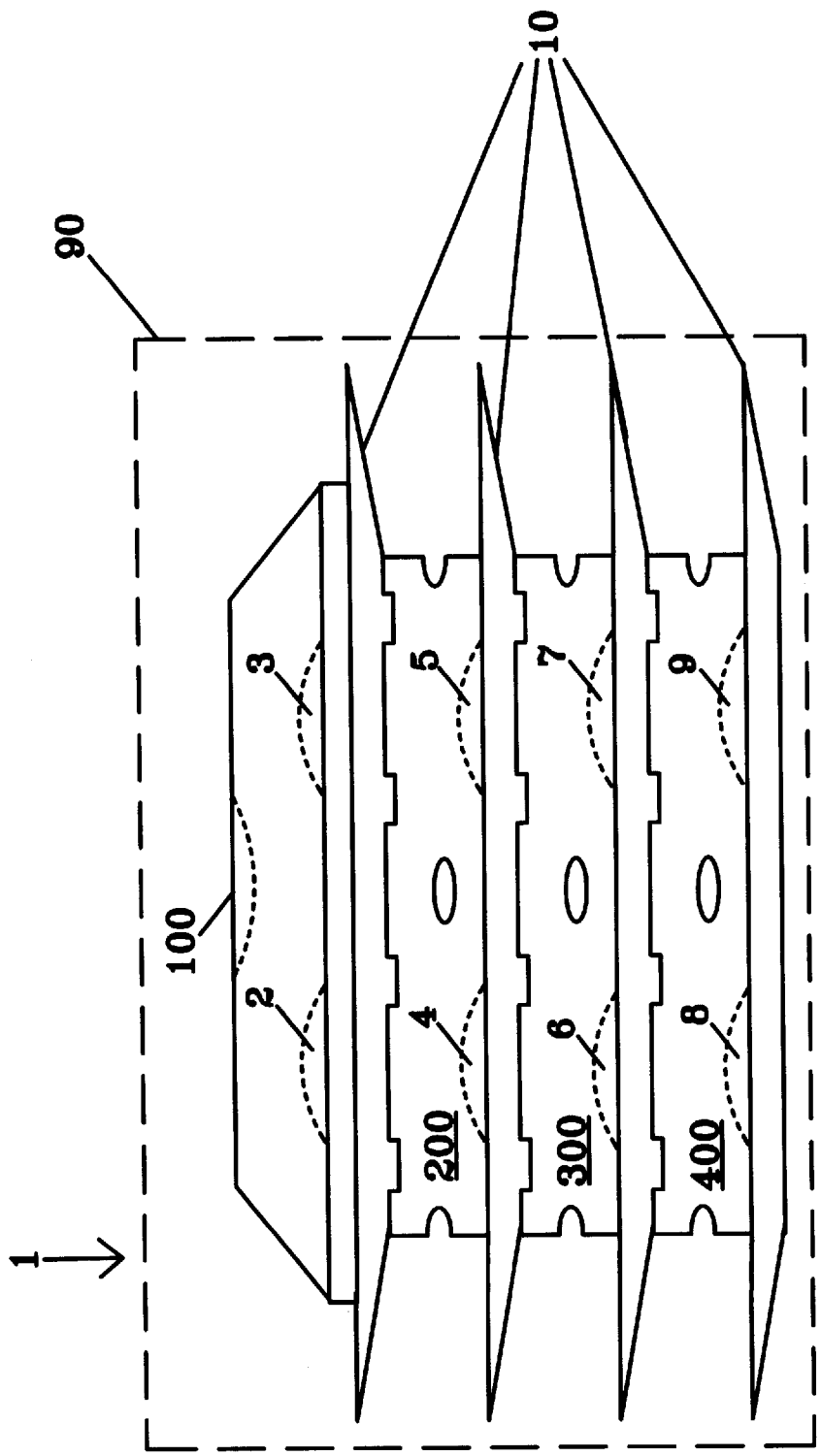

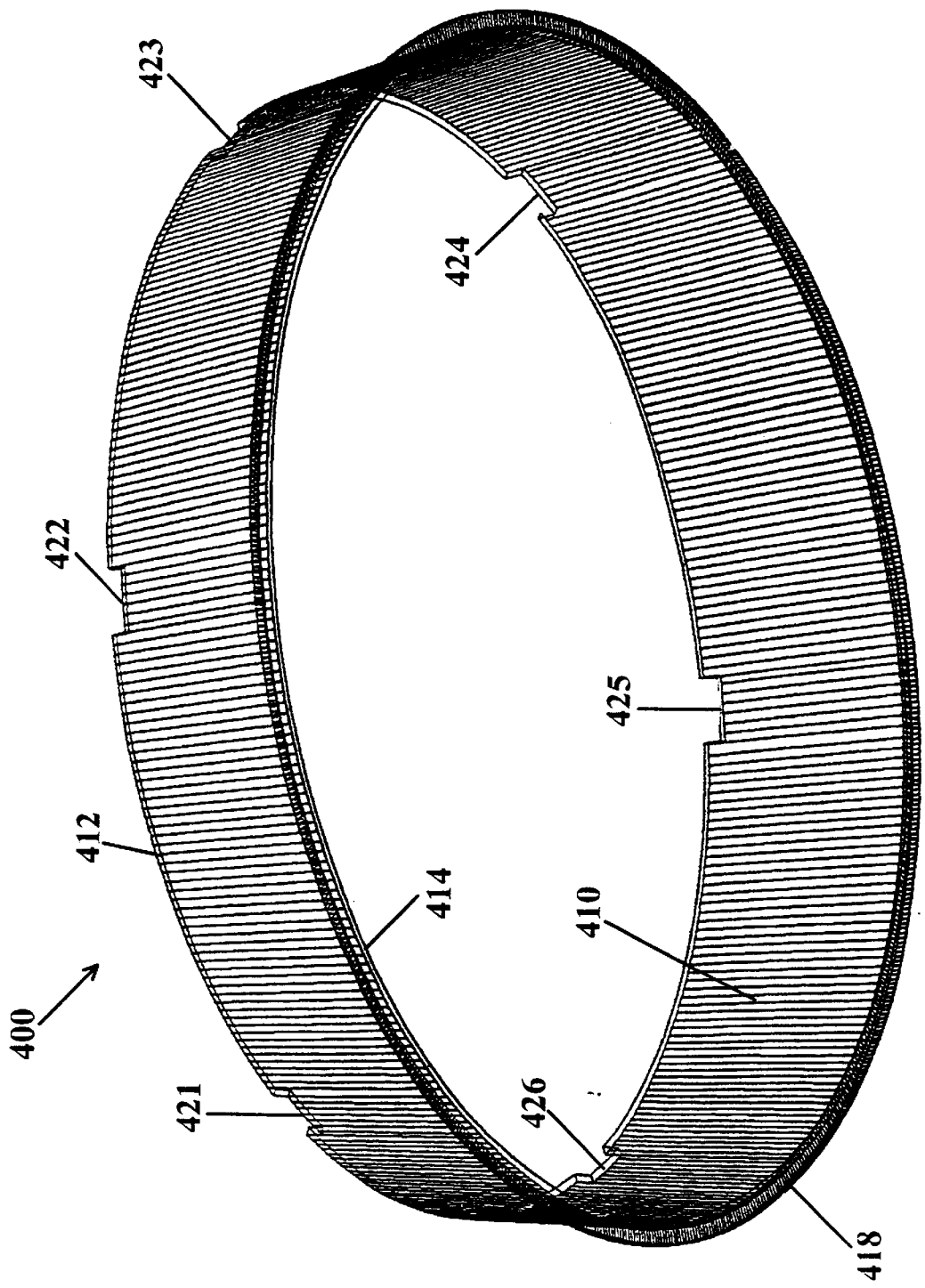

MICROWAVE HEATING AND COOKING RINGS AND LIDS

This invention relates to cooking, and in particular to stackable plates, with novel ring spacers and cover for allowing multiple plates of food to be simultaneously microwaved.

BACKGROUND AND PRIOR ART

Microwave ovens have exploded in popularity for quickly heating food. Uncovered food in a microwave has a tendency to dry out over when being cooked. Plastic sheaths such as Saran® wrap have been used to cover single microwave plates. A microwaveable cooking hood has been used that completely covers about a single plate. See U.S. Pat. No. 5,028,754 to Chiba. However, none of the known prior art allows for having plural plates of food to be microwaved at one time. Often it important in both commercial use(i.e. restaurants) and residential home use to be able to simultaneously heat up plural food plates. Multiple plates cannot be adequately stacked on top of plastic sheath covered plates.

U.S. Pat. No. 4,847,461 to Gilmore describes a "stackable plate arrangement for microwave dishes", title. However, the Gilmore patent interconnects plural discs with vertical pole supports. The Gilmore device would require the user to build the structure as plates are being mounted on each level and then the entire structure with plural plates is inserted into a microwave. Besides the inherent difficulty of having to move the entire multi-level structure at one time, there are no covers for each of the multi-levels. One still has to use plastic sheathing and/or hood covers on each level.

U.S. Pat. No. 3,642,165 to Von der Osten describes a "stackable table service", title. However, this patent is directed toward creating a unique and uniform place settings of modifying existing plates to be somewhat bowl shaped with side extending rims, and separating insert plates therebetween. The elaborate Von der Osten device cannot be used with everyday type planar shaped plates that most people use to be microwaved. Von der Osten further does not allow for a cover for the top plate, and does not describe any use for being microwaved.

U.S. Pat. No. 1,793,298 to Alaj describes a "combination dish and cover", that appears in FIG. 2 to be stackable. However, the Alaj devices are basically flat topped hood covers made from "metallic" type materials, that cannot be used in microwaves. Furthermore, each of the hoods requires covering lids with smooth sides that slope outward with thickened rim bases. The smooth sides do not allow users to be able to grip the hoods by their sides.

Covering food plates substantially with plastic sheaths and covers does not allow food to be evenly cooked and causes pressure to buildup under the closed covers. Furthermore sealing off the plates does causes all the different food on a plate to be contaminated and overpowered by other food so that the food taste becomes mixed.

SUMMARY OF THE INVENTION

The first objective of the present invention is to provide microwaveable rings and cover arrangement that allow multiple plates to be microwaved simultaneously in a stack arrangement.

The second object of this invention is to provide a rings and cover arrangement that allows plural plates of food to be separated from one another in a microwave oven.

The third object of this invention is to provide microwaveable rings and cover arrangement that can be used with everyday microwaveable plates.

The fourth object of this invention is to provide microwaveable rings and a cover having slot-holes and grooves for allowing stacks of food filled plates to be evenly cooked.

The fifth object of this invention is to provide microwaveable rings and a cover having slot-holes and grooves for allowing stacks of food filled plates so that heat can be evenly dispersed and internal pressure can be relieved from building up.

The sixth object of this invention is to provide microwaveable rings and a cover having slot-holes and grooves to allow for air circulation about the food so that one food taste does not contaminate other foods on the same plate.

The seventh object of this invention is to provide for stacking multiple levels of food filled plates for storage in a refrigerator/freezer.

A preferred embodiment of the stacking arrangement combination includes a first plate, with a first hollow plastic ring being thereon, and through-hole slots in the ring for allowing air to circulate inside the first ring. A second plate can be positioned over the first hollow ring, and a plastic cover having a substantially closed lid portion having a handle with adjacent through-hole can substantially covers the upper surface of the second plate. The ring and cover allows the first plate and the second plate to be stacked on top of one another when placed in a microwave oven.

The first hollow ring further includes a raised rim edge about a base of the first hollow ring, wherein the upper edge of the ring has a larger diameter than the lower edge of the ring. The cover lid also has an upper edge with a larger diameter than the lower edge. The through-hole slots in the ring can include upper rectangular through-holes about an upper edge of the first hollow ring, and side oval through-holes in the first hollow ring.

All the novel rings can be stacked within one another and inserted within the lid cover so that the combined rings and cover can be easily stored for later use.

Further objects and advantages of this invention will be apparent from the following detailed description of a presently preferred embodiment which is illustrated schematically in the accompanying drawings.

BRIEF DESCRIPTION OF THE FIGURES

FIG. 1 is a side view of an assembled stack of the rings, lid and plates of the novel invention.

FIG. 4 is a perspective view of another hollow ring for use with assembled stack of FIG. 1 without side oval vents.

DESCRIPTION OF THE PREFERRED EMBODIMENT

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

Figure 2A:
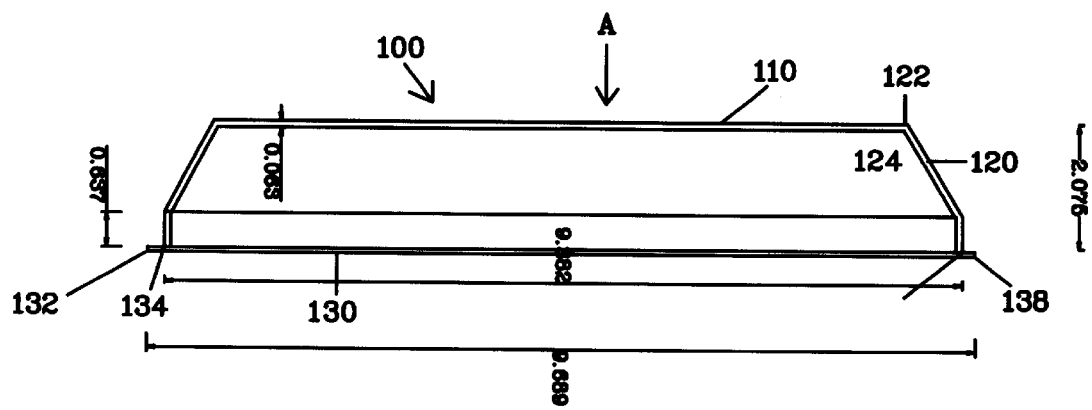
FIG. 2A is a side view of the lid cover used in FIG. 1.
Figure 2B:
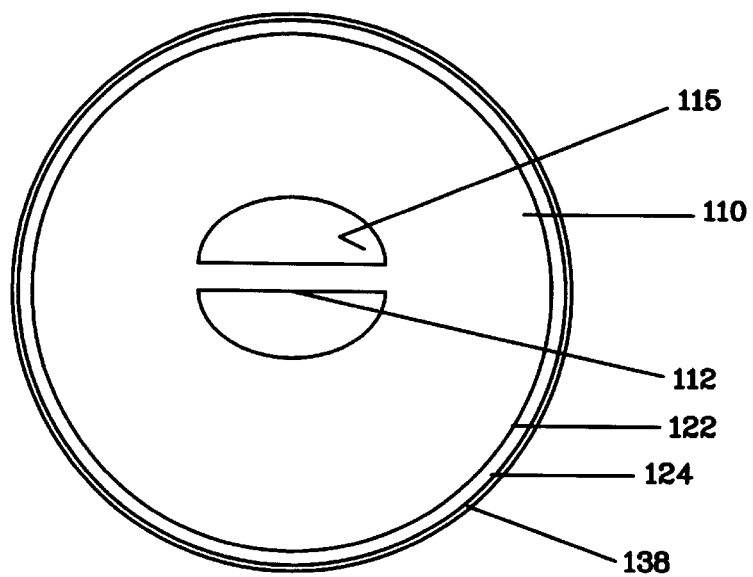
FIG. 2B is a top view of the lid cover of FIG. 2A along arrow A.

FIG. 1 is a side view of an assembled stack 1 of the rings 200, 300, 400, lid 100 and everyday type planar plates 10 of the novel invention where different types of food 1, 2, 3, 4, 5, 6, 7, 8, 9 can be positioned on the plates 10 and be evenly cooked when placed in a microwave oven 90. FIG. 2A is a side view of the lid cover 100 used in FIG. 1. FIG. 2B is a top view of the lid cover 100 of FIG. 2A along arrow A. Referring to FIGS. 1, 2A and 2B, lid cover 100 includes top cover portion 110 having a diameter of approximately 9.125 inches, with horizontal handle 112 and air-openings 115 about the handle 112. Side 120 slopes outward from a minimum top diameter 122 of approximately 9.125 inches to an enlarged middle 124 and bottom 136 diameter of approximately 9.382 inches. The height of uniform cylindrical portion 124–136 of lid 100 is approximately 0.637 inches. A rim 132, 138 having a diameter of approximately 9.689 inches is about bottom opening 130. The bottom opening 130 allows the lid cover 100 to be used as a top cover on a top plate 10 in stack 1 of FIG. 1. Lid cover has an overall height from top 110 to bottom rim 138 of approximately 2.075 inches. The the walls of the lid 100 are approximately 0.063 inches thick. Lid cover 100 can be formed from injection molded microwaveable plastic such as polypropylene and the like.

Figure 3B:
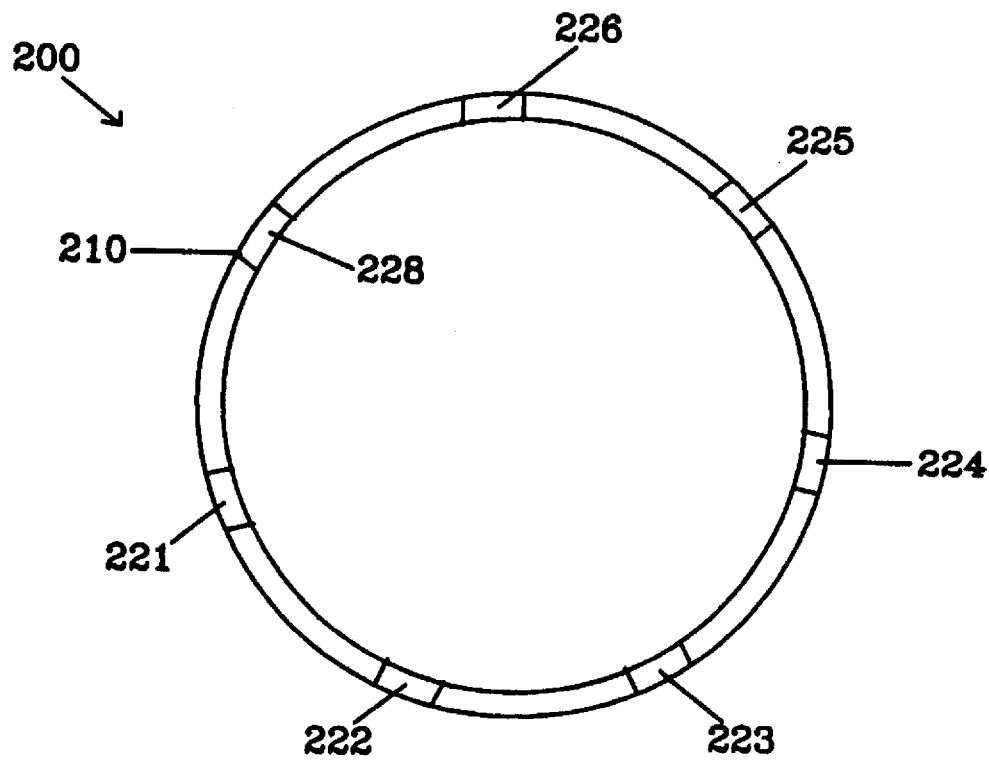
FIG. 3B is a top view of the ring of FIG. 3A along arrow B.
Figure 3A:
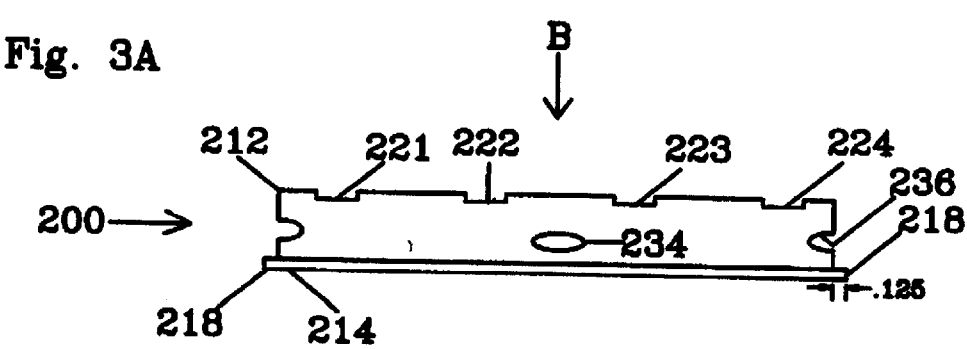
FIG. 3A is a side view of a ring used in FIG. 1.
Figure 3C:
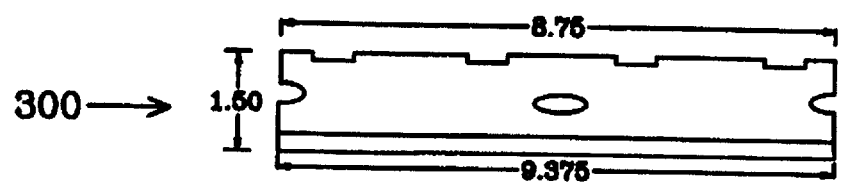
FIG. 3C is a side view of another ring used in FIG. 1.

FIG. 3A is a side view of a ring 200 used in FIG. 1. FIG. 3B is a top view of the ring 200 of FIG. 3A along arrow B. FIG. 3C is a side view of another ring 300 used in FIG. 1 which is identical to the previous shown ring 200. Referring to FIGS. 1 and 3A–3C, hollow ring 200 includes upper edge 212 having an inner diameter of approximately 8.75 inches with rectangular cut-out slots/vents 221, 222, 223, 224, 225, 226, 227, 228, each being approximately 0.5 inches wide by 0.125 inches high. The outer cylindrical side 210 slopes outward from upper edge 212 to base portion 214 which has a diameter of approximately 9.375 inches. An outer rim 218 encircles the base portion 214 which is approximately 0.125 inches wide by approximately 0.125 inches high. The side 210 of the ring is approximately 1.50 inches in height. Around the side 210 of ring 200 are equally spaced oval shaped vents similar to the slots/vents 221–228. The dimensions of hollow ring 300 are identical to that of hollow ring 200 described above. Referring to FIGS. 1–3B, the rectangular and oval slots/vents 221–228 and 232–236 and lid/cover through-holes 115 allow for food 1–9 on stacked plates 10 allow heat to be evenly dispensed over the food and relieves any pressure from building up. These slots/vents further help air circulation above each of the plates 10, so that one food taste does not contaminate another food taste among the different foods 1–9 on each of the plates 10. Furthermore, these slots/vents allow the user to put their fingers into the slots/vents to make it easier to move the hole stack 1 or parts thereof. Both the cover/lid 100 and the rings 200, 300 each can have thicknesses of the material used to be approximately 0.125 inches.

FIG. 4 is a perspective view of another hollow ring 400 for use with assembled stack 1 of FIG. 1 without side oval vents. Referring to FIG. 4, ring 400 includes upper edge 412 with rectangular cut-out slot/vents 421, 422, 423, 424, 425, 426 which correspond to slot/vents 321–326 described in the previous embodiment. Upper edge 412 can have an outer diameter of approximately 8.75 inches. Bottom edge 414 can have a diameter of approximately 8.904 inches, and rim 418 can have a diameter of approximately 9.25 inches. Ring side 410 and bottom edge 414, and rim 418 correspond to similar components labeled with respect to the preceding Figures.

Figure 5:
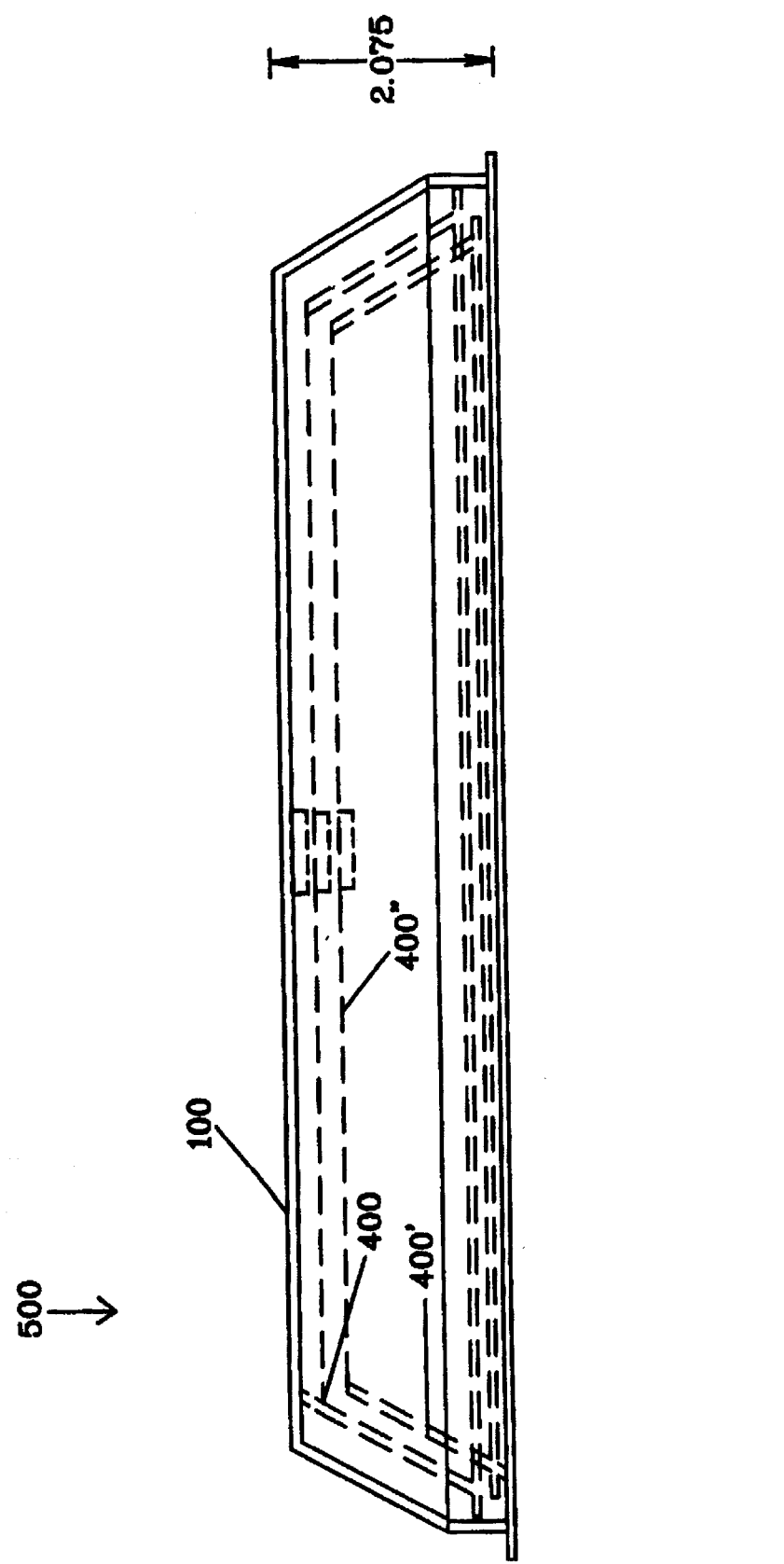
FIG. 5 is a side view of the lid cover and rings of the above Figures inserted in another for storage.

FIG. 5 is a side cross-sectional view 500 of the lid cover 100 and rings 400, 400', 400" of the above FIGS. 2A–2B and 4 inserted within one another for storage. The overall height of stacking the rings 400, 400', 400" when inserted within the bottom opening of lid cover 100 is approximately 2.075 inches.

While the preferred embodiment has been described primarily with being used in a microwave oven, the invention can be used for storage purposes in a refrigerators/freezers, and mobile type hot boxes, and anywhere where multiple stacks of plates need to be used in places such as but not limited to catering halls, ships, banquets and the like.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A stacking arrangement for placing plural plates into a microwave oven with a cover-lid and rings that can be stored within the cover-lid when not being used, the arrangement comprising in combination:

a first plate;

a first hollow ring formed from a microwaveable material with side through-holes for allowing air to circulate inside the first hollow ring, the first hollow ring being positioned on an upper surface of the first plate;

a second plate positioned over the first hollow ring; and a cover formed from a microwaveable material with through-holes, the cover having a substantially closed lid portion and side for substantially covering an upper surface of the second plate, wherein the first ring and the cover lid allow the first plate and the second plate to be stacked on top of one another when placed in a microwave oven and the cover being sized to allow the first hollow ring to be stored inside the cover when not being used in the microwave oven.

2. The stacking arrangement of claim 1, wherein the first hollow ring includes:

an upper edge; and a lower edge, the lower edge having a diameter larger than that of the upper edge.

3. The stacking arrangement of claim 2, wherein the first hollow ring includes:

the upper edge having a diameter of approximately 8.75 inches; and the lower edge having a diameter of approximately 8.90 inches.

4. The stacking arrangement of claim 1, wherein the through-hole slots further includes:

upper rectangular through-holes about the upper edge of the first hollow ring.

5. The stacking arrangement of claim 1, wherein the through-hole slots further includes:

side oval through-holes in the first hollow ring.

6. The stacking arrangement of claim 1, wherein the first hollow ring includes:

a raised rim edge about a base of the first hollow ring.

7. The stacking arrangement of claim 1, wherein the cover lid includes:

a handle in the lid portion.

8. The stacking arrangement of claim 1, wherein the cover lid includes:

an upper edge; and a lower edge, the lower edge having a diameter larger than the upper edge.

9. The stacking arrangement of claim 8, wherein the lid cover further includes:

a second lower edge beneath the first lower edge, the second lower edge being approximately the same diameter as the first lower edge.

10. The stacking arrangement of claim 9 further including:

an external rim about the lower edge of the cover lid.

11. The stacking arrangement of claim 8, wherein the cover lid includes:

the upper edge having a diameter of approximately 9.25 inches; and the lower edge having a diameter of approximately 9.382 inches.

12. The stacking arrangement of claim 1, wherein the first hollow ring and the cover are formed from:

microwaveable plastic.

13. The stacking arrangement of claim 1, further comprising:

a second hollow ring placed below the first plate; and a third plate positioned below the second hollow ring.

14. The stacking arrangement of claim 13, wherein the first hollow ring and the second hollow ring each includes:

an upper edge; and a lower edge, the lower edge having a diameter larger than that of the upper edge.

15. A stacking arrangement for placing plural plates into a microwave oven with a cover-lid and rings that can be stored within the cover-lid when not being used, the arrangement comprising in combination:

a first plate;

a first hollow plastic ring with outwardly sloping sides being positioned on an upper surface of the first plate;

through-hole slots in the ring for allowing air to circulate inside the first ring;

a second plate positioned over the first hollow ring;

a plastic cover with outwardly sloping sides having a substantially closed lid portion and side for substantially covering an upper surface of the second plate;

a handle in the lid portion with an air-circulating through-hole adjacent to the handle, wherein the first ring and the cover lid allow the first plate and the second plate to be stacked on top of one another when placed in a microwave oven, and the cover being sized to allow the first hollow ring to be able to be stored inside the cover.

16. The stacking arrangement of claim 15, wherein the first hollow ring and the lid each include:

a base having a raised rim edge.

17. The stacking arrangement of claim 15, wherein the first hollow ring includes:

an upper edge having a larger diameter than a lower edge; and the cover lid includes:

an upper edge having a larger diameter than an upper edge.

18. The stacking arrangement of claim 15, wherein the through-hole slots in the ring include:

upper rectangular through-holes about an upper edge of the first hollow ring; and side oval through-holes in the first hollow ring.

19. A stacking arrangement for placing plural plates into a microwave oven with a cover-lid and rings that can be stored within the cover-lid when not being used, the arrangement comprising in combination:

a first microwaveable plate;

a first hollow microwaveable ring being positioned on an upper surface of the first plate;

first through-hole slots in the first hollow ring for allowing air to circulate inside;

a second microwaveable plate positioned over the first hollow ring;

a second hollow microwaveable ring being positioned on an upper surface of the second plate;

second through-hole slots in the second hollow ring for allowing air to circulate inside;

a third microwaveable plate positioned over the second hollow ring;

a microwaveable cover having a substantially closed lid portion and side for substantially covering an upper surface of the third plate; and cover through-hole slots in the cover for allowing air to circulate, wherein the first ring, the second ring and the cover lid allow the first plate, the second plate, and the third plate to be stacked on top of one another when placed in a microwave oven, and the cover being sized to allow the first hollow ring and the second hollow ring to be stored inside the cover when not being used.

20. The stacking arrangement for placing plural plates into a microwave oven of claim 19, further comprising:

a third hollow microwaveable ring positioned over the third plate;

third through-hole slots in the third hollow ring for allowing air to circulate inside;

a fourth microwaveable plate positioned over the third hollow ring, and the cover is positioned over the fourth microwaveable plate, wherein the first ring, the second ring, the third ring and the cover lid allow the first plate, the second plate, the third plate and the fourth plate to be stacked on top of one another when placed in a microwave oven, and the cover being sized to allow the first hollow ring, the second hollow ring, and the third hollow ring to be stored inside the cover when not being used.

* * * * *